US010511763B1

(12) United States Patent
Szeto et al.

(10) Patent No.: US 10,511,763 B1
(45) Date of Patent: Dec. 17, 2019

(54) STARTING ELECTRONIC COMMUNICATION BASED ON CAPTURED IMAGE

(71) Applicant: Microsoft Technology Licensing, LLC, Redmond, WA (US)

(72) Inventors: Christopher Szeto, Mountain View, CA (US); Viet Hung Nguyen, Fremont, CA (US); Jingwei Huang, Campbell, CA (US); Haowen Ning, Sunnyvale, CA (US); Haoyang Li, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 16/011,984

(22) Filed: Jun. 19, 2018

(51) Int. Cl.
*H04N 5/232* (2006.01)

(52) U.S. Cl.
CPC ..... *H04N 5/23219* (2013.01); *H04N 5/23206* (2013.01)

(58) Field of Classification Search
CPC .............. H04N 5/23206; H04N 5/23219
See application file for complete search history.

(56) References Cited

U.S. PATENT DOCUMENTS

| | | | | |
|---|---|---|---|---|
| 8,520,907 B2* | 8/2013 | Lai | ......................... | H04M 1/575 348/14.02 |
| 8,670,597 B2* | 3/2014 | Petrou | ................ | G06K 9/00288 382/116 |
| 10,013,153 B1* | 7/2018 | Freeman | ............. | G06F 3/04842 |
| 10,318,812 B2* | 6/2019 | Bhogal | ............. | G06K 9/00677 |
| 2010/0287053 A1* | 11/2010 | Ganong | ............ | G06K 9/00248 705/14.66 |
| 2013/0077835 A1* | 3/2013 | Kritt | .................. | G06K 9/00288 382/118 |
| 2013/0156274 A1* | 6/2013 | Buchmueller | ....... | G06Q 10/101 382/118 |
| 2015/0085146 A1* | 3/2015 | Khemkar | ............... | H04N 7/147 348/207.1 |
| 2015/0319217 A1* | 11/2015 | Shakib | ............... | G06K 9/00288 709/204 |
| 2017/0078454 A1* | 3/2017 | Berookhim | ........ | G06K 9/00288 |

* cited by examiner

*Primary Examiner* — Timothy J Henn
(74) *Attorney, Agent, or Firm* — Schwegman Lundberg & Woessner, P.A.

(57) ABSTRACT

Techniques for starting an electronic communication based on a captured image are disclosed herein. In some embodiments, a computer system detects that an image has been captured by a camera on a first mobile device of a first user, where the captured image has been captured by the camera at a point in time, and, in response to detecting that the image has been captured, the computer system identifies at least one other user in the captured image. In some example embodiments, the computer system transmits a message to an electronic destination associated with the other user(s) based on the identifying of the other user(s) in the captured image.

20 Claims, 12 Drawing Sheets

US 10,511,763 B1

STARTING ELECTRONIC COMMUNICATION BASED ON CAPTURED IMAGE

TECHNICAL FIELD

The present application relates generally to systems, methods, and computer program products for starting electronic communication based on a captured image.

BACKGROUND

Starting an electronic communication with other people, such as an e-mail message, a text message, or a conversation within a messaging application of a mobile app, often requires multiple operations to be performed by a user. For example, the user typically has to manually specify the identities of the other people or electronic destinations associated with the other people (e.g., e-mail addresses, phone numbers). Additionally, if the user wants to include a picture in the electronic communication, such as a group selfie including the other people, the user has to manually select the picture to include it in the electronic communication. As a result of having to perform all of these operations, the amount of time and complexity that is involved in sending an electronic communication is increased. Other technical problems may arise as well.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
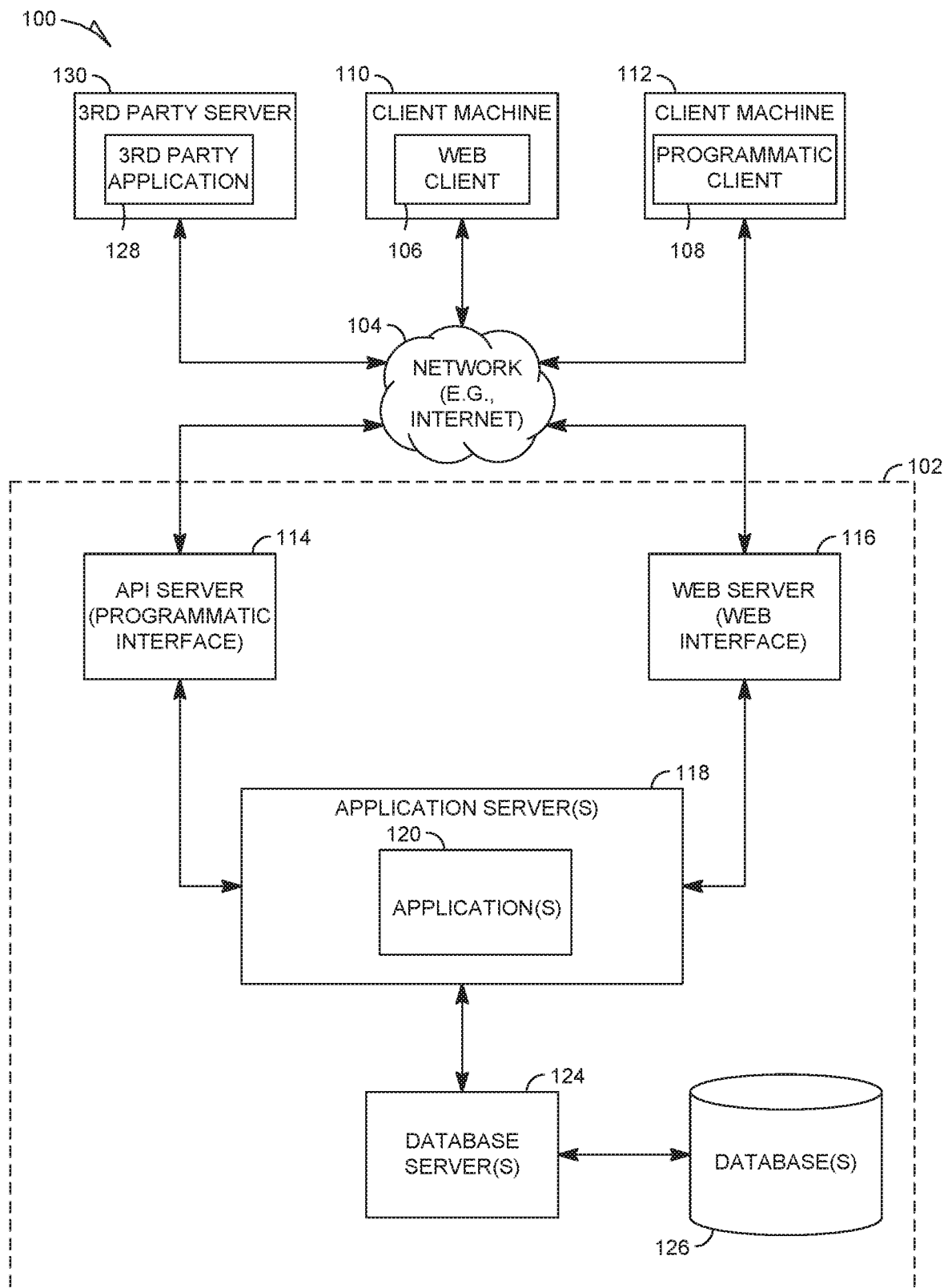
FIG. 1 is a block diagram illustrating a client-server system, in accordance with an example embodiment.

Example methods and systems of starting an electronic communication based on a captured image are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. Some technical effects of the system and method of the present disclosure are to reduce the number of operations that need to be performed to start an electronic communication with other users by starting the electronic communication based on a captured image of the other users. The system can identify other users in a captured image by comparing user profile images with the captured image, and then use those identifications to determine electronic destinations for transmitting the electronic communication. Furthermore, the system can minimize the search space of user profile images that are compared with the captured image by filtering the user profile images used based on location of the corresponding users, thereby improving the speed of the identification process, and consequently improving the speed of starting the electronic communication. Additionally, other technical effects will be apparent from this disclosure as well.

In some example embodiments, operations are performed by a computer system (or other machine) having a memory and at least one hardware processor, with the operations comprising: detecting that an image has been captured by a camera on a first mobile device of a first user, the captured image having been captured by the camera at a point in time; in response to detecting that the image has been captured, identifying at least one other user in the captured image; and transmitting a message to an electronic destination associated with the at least one other user based on the identifying of the at least one other user in the captured image.

In some example embodiments, the identifying comprises: determining a location of the first mobile device for the point in time; identifying a plurality of candidate users based on a determination that the plurality of candidate users are located near the determined location of the first mobile device for the point in time; for each one of the candidate users, accessing at least one profile image of the one of the candidate users from a corresponding profile of the one of the candidate users on a social networking service; for each one of the candidate users, comparing the at least one profile image of the one of the candidate user with the captured image; and determining that a subset of the candidate users are present in the captured image based on the comparing, the subset of the candidate users being identified as the at least one other user in the captured image.

In some example embodiments, the identifying further comprises: causing a user interface to be displayed on the first mobile device, the user interface displaying an indication of each candidate user in the subset of candidate users, and the user interface being configured to receive user input from the first user to confirm, for each one of the candidate users in the subset of candidate users, whether the one of the candidate users is present in the captured image; and receiving, from the first mobile device, user input confirming that the subset of candidate users are present in the captured image, wherein the determining that the subset of the candidate users are present in the captured image is further based on user input confirming that the subset of candidate users are present in the captured image.

In some example embodiments, the operations further comprise: determining a corresponding level of relevance for each candidate user in the subset of candidate users; and ranking the candidate users in the subset of candidate users based on their corresponding levels of relevance, wherein the indications of the candidate users in the subset of candidate users are displayed in an order based on the ranking.

In some example embodiments, the operations further comprise generating the message in response to the determining that the subset of the candidate users are present in the captured image.

In some example embodiments, the generating the message comprises automatically including the captured image in the message without receiving a user instruction from the first mobile device to include the captured image in the message.

In some example embodiments, the generating the message comprises automatically addressing the message to the electronic destination without the first user specifying the electronic destination.

In some example embodiments, the operations further comprise: determining that an additional user in the captured image cannot be identified in the identifying of at least one other user in the captured image; causing a user interface to be displayed on the first mobile device, the user interface displaying an indication of the additional user in the captured image, and the user interface being configured to receive an identification of the additional user from the first user; and receiving the identification of the additional user from the first mobile device, wherein the message is transmitted to an electronic destination associated with the additional user based on the identification of the additional user.

In some example embodiments, the comparing of the at least one profile image of the one of the candidate user with the captured image is based on a facial recognition model, and the operations further comprise: modifying the facial recognition model using one or more machine learning operations based on the captured image and the identification of the additional user.

In some example embodiments, performance of the identifying the at least one other user in the captured image is conditioned upon a determination the captured image includes the first user.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
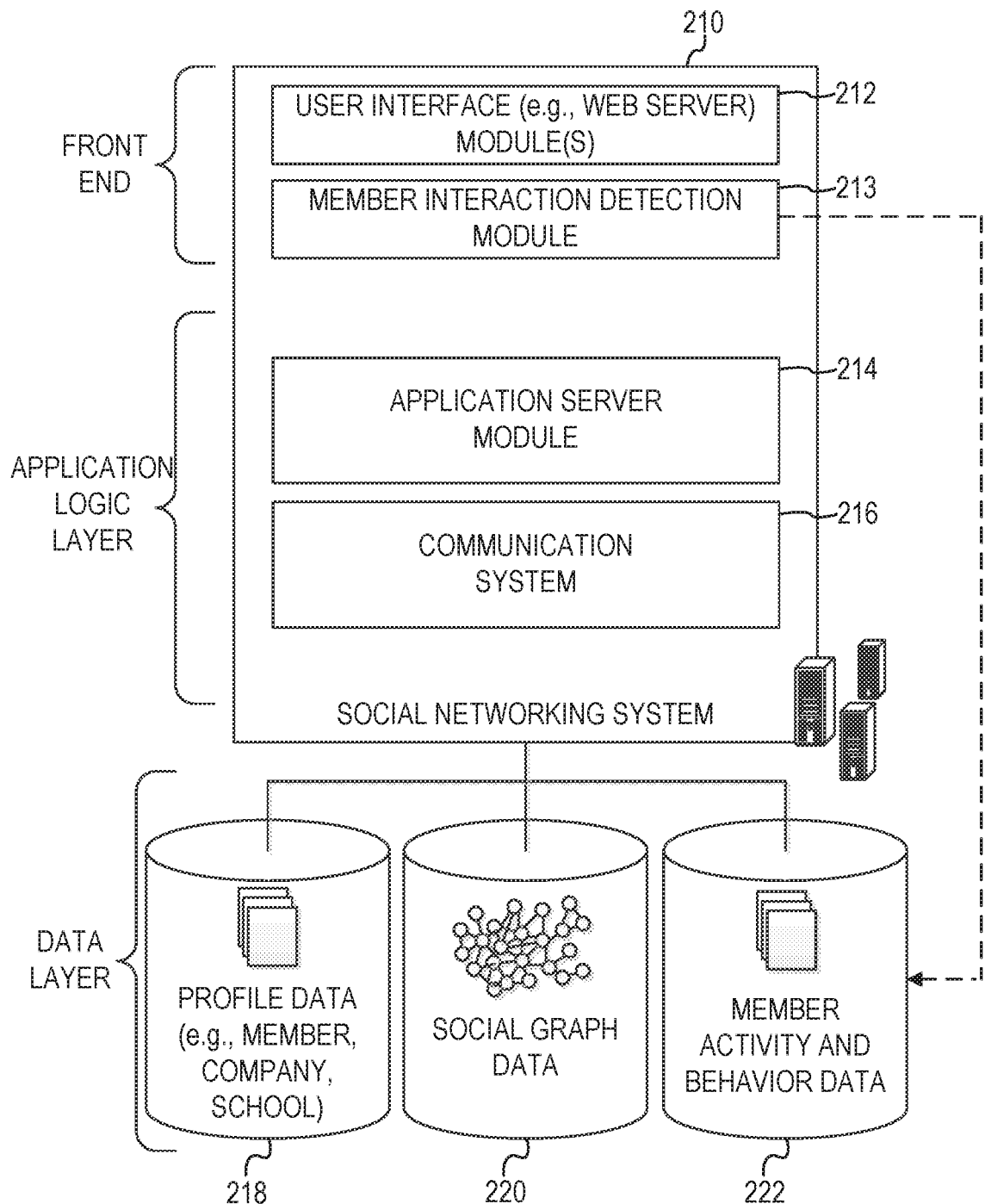
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a communication system 216, for use in social networking system 210, consistent with some embodiments of the present disclosure. In some embodiments, the communication system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the communication system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile. Additionally, one or more profile images (e.g., photos of the member) may be stored in the database 218.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the communication system 216. The members' interactions and behavior may also be tracked, stored, and used by a pre-fetch system 400 residing on a client device, such as within a browser of the client device, as will be discussed in further detail below.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the communication system 216 is referred to herein as being used in the context of a social networking service, it is contemplated that it may also be employed in the context of any website or online services. Additionally, features of the present disclosure can be used or presented in the context of a web page or any other user interface view, including, but not limited to, a user interface on a mobile device or on desktop software.

Figure 3:
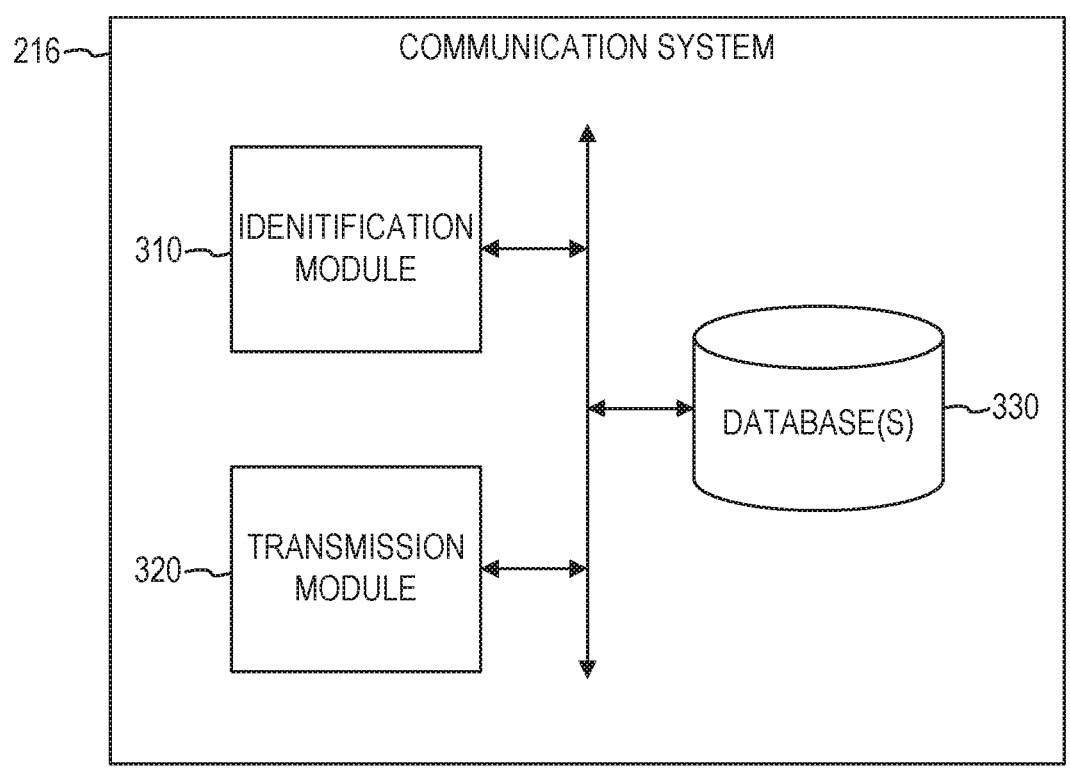
FIG. 3 is a block diagram illustrating a communication system, in accordance with an example embodiment.

FIG. 3 is a block diagram illustrating a communication system 216, in accordance with an example embodiment. In some example embodiments, the communication system 216 comprises any combination of one or more of an identification module 310, a transmission module 220, and one or more databases 330. The modules 310 and 320 and the database(s) 330 can reside on a computer system, or other machine, having a memory and at least one processor (not shown). In some embodiments, the modules 310 and 320 and the database(s) 330 can be incorporated into the application server(s) 118 in FIG. 1. In some example embodiments, the database(s) 330 is incorporated into database(s) 126 in FIG. 1 and can include any combination of one or more of databases 218, 220, and 222 in FIG. 2. However, it is contemplated that other configurations of the modules 310 and 320, as well as the database(s) 330, are also within the scope of the present disclosure.

In some example embodiments, one or more of the modules 310 and 320 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310 and 320 is configured to receive user input. For example, one or more of the modules 310 and 320 can present one or more GUI elements (e.g., drop-down menu, selectable buttons, text field) with which a user can submit input.

In some example embodiments, one or more of the modules 310 and 320 is configured to perform various communication functions to facilitate the functionality described herein, such as by communicating with the social networking system 210 via the network 104 using a wired or wireless connection. Any combination of one or more of the modules 310 and 320 may also provide various web services or functions, such as retrieving information from the third party servers 130 and the social networking system 210. Information retrieved by the any of the modules 310 and 320 may include profile data corresponding to users and members of the social networking service of the social networking system 210.

Additionally, any combination of one or more of the modules 310 and 320 can provide various data functionality, such as exchanging information with the database(s) 330. For example, any of the modules 310 and 320 can access profile data, social graph data, and member activity and behavior data from the databases 218, 220, and 222 in FIG. 2, as well as exchange information with third party servers 130, client machines 110, 112, and other sources of information.

In some example embodiments, the identification module 310 is configured to detect that an image has been captured by a camera on a mobile device (e.g., smartphone, tablet computer) of a first user. The image is captured by the camera at a particular point in time (e.g., Jun. 2, 2018 at 6:52 pm), and the identification module 310 may associate the particular point in time with the captured image, such as by storing the particular point in time in the database(s) 330 in association with the captured image.

The captured image may be a group selfie that includes the first user of the mobile device and at least one other user. In some example embodiments, the identification module 310 is configured to identify the other user(s) in the captured image in response to, or otherwise based on, the detecting that the image has been captured. For example, the identification module 310 may compare images of users who could potentially be present in the captured image, who may be referred to herein as candidate users, with the captured image using one or more facial recognition operations to match the faces of candidate users with the faces of the other users in the captured image. In some example embodiments, the identification module 310 uses profile images of users from a social networking service for comparing with the captured image so that the identity of the users can be determined by the profile images. For example, the identification module 310 can determine that a profile image belongs to John Smith based the profile image being stored by the social networking service as a profile image for John Smith, and then determine that John Smith is present in the captured image based on a match between the profile image and one of the faces in the captured image.

However, a technical problem arises in the massive number of profile images that exist, which creates an extraordinarily large search space with which to compare the captured image, resulting in slow performance speed for identifying the users in the captured image. The identification module 310 may solve this technical problem by restricting the search space to include only candidate users that are determined to have been located near (e.g., within a particular distance of) the location where the image was captured during the time the image was captured. For example, in some example embodiments, the identification module 310 is configured to determine a location of the mobile device used to capture the image for the point in time at which the image was captured, and then identify a plurality of candidate users based on a determination that each one of the plurality of candidate users is or was located near the determined location of the mobile device for that point in time. The identification module 310 may determine the location of the mobile device in a variety of ways, including, but not limited to, using GPS data of the mobile device or using self-reported positioning or check-in data of the user associated with the mobile device.

In some example embodiments, the identification module 310 is configured to, for each one of the candidate users, access at least one profile image of the candidate user from a corresponding profile of the candidate user on a social networking service (e.g., from the database(s) 330 in FIG. 3 or the database 218 in FIG. 2), and then compare the accessed profile image(s) of the candidate user with the captured image. For example, the identification module 310 may use one or more facial recognition operations to determine if there is a match between the accessed profile image(s) and any faces in the captured image. In some example embodiments, the identification module 310 is configured to determine whether or not a candidate user is present in the captured image based on the comparison of the profile image(s) of the candidate user with the captured image. For example, if the identification module 310 determines that there is a match between the profile image and the captured image, then the identification module 310 determines that the candidate user is present in the captured image. In this respect, the identification module 310 may determine that a subset of the candidate users (e.g., a portion of the candidate users less than all of the candidate users) are present in the captured image based on the comparison operation(s) performed by the identification module 310. In some example embodiments, the identification module 310 is configured to identify this subset of the plurality of candidate users as the other user(s) in the captured image.

In some example embodiments, the identification module 310 is also configured to determine whether or not the first user is present in the captured image. For example, the identification module 310 may determine the identity of the first user of the mobile device, such as based on an IP address of the mobile device, then locate a profile image of the identified first user, and compare the profile image of the first user with the captured image, similar to the comparison of the profile images of the candidate users with the captured image. In some example embodiments, the identification module 310 is configured to condition its performance of the identifying the other user(s) in the captured image upon a determination the captured image includes the first user. By enforcing this requirement that the first user be present in the captured image in order for the identifying of the other user(s) to be performed, the identification module 310 may prevent the first user from simply taking pictures of strangers in order to determine their identity, since the first user would be forced to take a group selfie in order for the identification module 310 to identify any other users. This feature helps protect the privacy and security of other users.

In some example embodiments, the transmission module 320 is configured to transmit a message to an electronic destination associated with identified other user(s) based on the identifying of the other user(s) in the captured image. Examples of electronic destinations include, but are not limited to, e-mail addresses or accounts, cell phone numbers or accounts, messaging application addresses or accounts, and social networking addresses or accounts. Other types of electronic destinations that can be associated with users are also within the scope of the present disclosure.

In some example embodiments, the transmission module 320 is configured to generate the message in response to the identifying of the other user(s) in the captured image. In some example embodiments, the generating the message comprises automatically including the captured image in the message without receiving a user instruction from the mobile device to include the captured image in the message. For example, the first user does not need to actively select the captured image for inclusion in the message. Rather, the captured image would automatically be included in the message simply by the first user taking the group selfie.

In some example embodiments, the transmission module 320 is configured to, in generating the message, automatically address the message to the electronic destination(s) of the identified other user(s) without the first user specifying the electronic destination. For example, the first user does not need to actively select or enter any electronic destinations for the message. Rather, electronic destination(s) would automatically be determined and inserted into the destination field of the message based on the identification of the other user(s) simply by the first user taking the group selfie.

Figure 4:
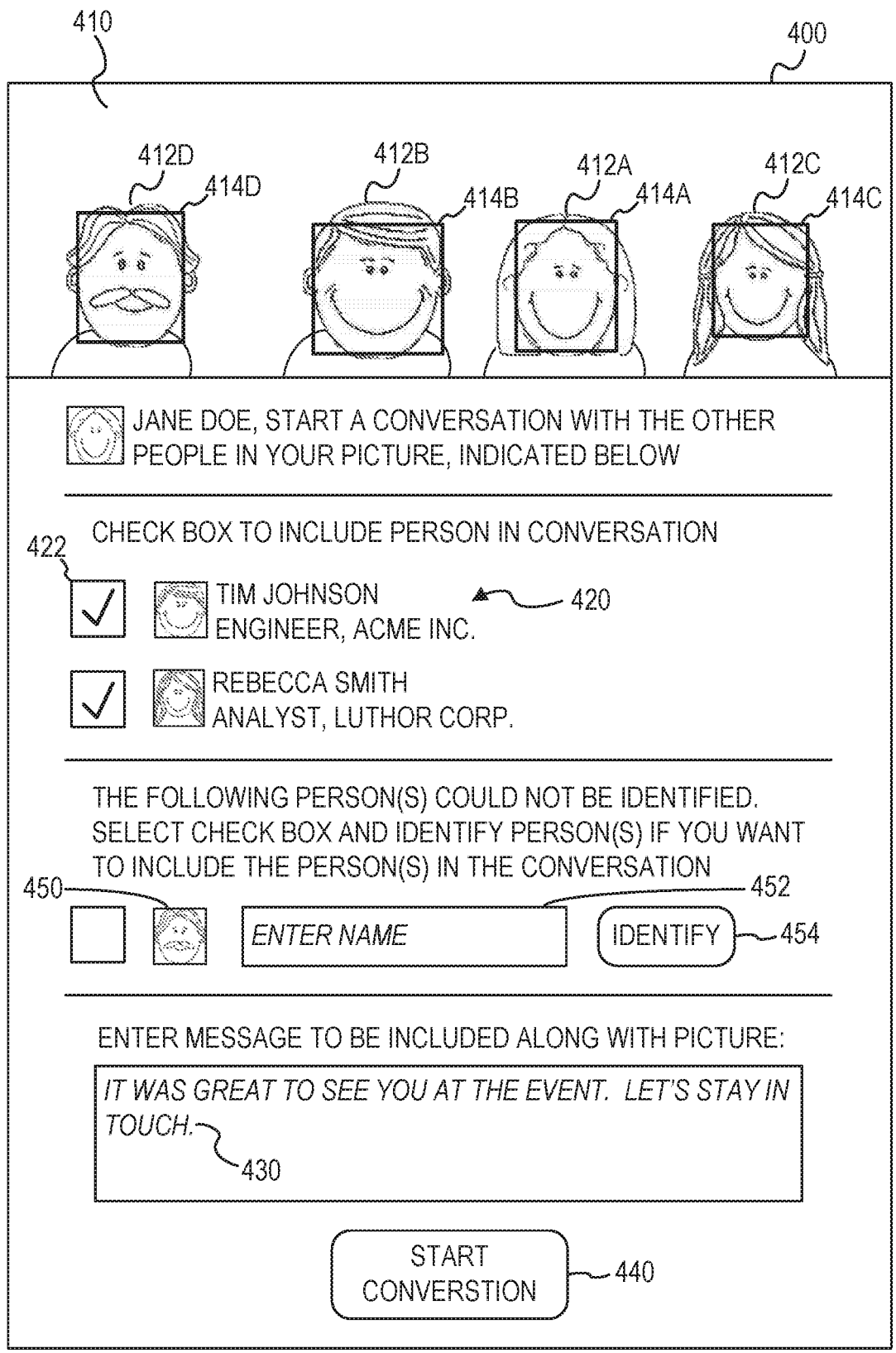
FIG. 4 illustrates a user interface displaying a captured image and an indication of candidate users identified as being present in the captured image, in accordance with an example embodiment.

In some example embodiments, the identification module 310 is configured to provide a preview of the identified other user(s) that will be included in the message for the first user to confirm or correct. FIG. 4 illustrates a user interface 400 displaying a captured image 410 and an indication 420 of candidate users identified as being present in the captured image 410, in accordance with an example embodiment. The captured image 410 includes the faces of users 412, which may include a first user 412-A to whom the mobile device used to capture the image 410 belongs, as well as other users 412-B, 412-C, and 412-D. The preview of the captured image 410 may include corresponding boundaries 414-A, 414-B, 414-C, and 414-D (e.g., boxes) around the faces of the users 412 in the captured image 410, thereby revealing which faces in the captured image 410 were used as the basis for identifying the users present in the captured image 410. The indication 420 may include a corresponding image and name of each user 412 that is identified, as well as other information that can be retrieved from the profile of the user 412, such as job title, company, etc.

In some example embodiments, the user interface 400 is configured to receive user input from the first user to confirm, for each one of the candidate users in the subset of candidate users (e.g., indicated by the indication 420), whether the candidate user is present in the captured image 410. The user interface 400 may display one or more selectable user interface elements 422 that the user may select to provide input confirming whether or not each candidate user indicated by the indication 420 should be included in the message based on the captured image 410. In the example shown in FIG. 4, the identified candidate users included in the indication 420 are automatically selected as being present in the captured image, and are therefore to be automatically included as recipients of the message to be generated and transmitted based on the captured image 410. By de-selecting a candidate user, such as via the corresponding selectable user interface element 422, the candidate user may be removed from inclusion as a recipient of the message to be generates and transmitted based on the captured image 410.

Although the example shown in FIG. 4 only shows, via the indication 420, a few other users being presented for possible inclusion in a message, it is possible that the number of other users can be large. Since the amount of display area available on mobile devices is very limited, a technical problem arises in effectively providing a preview of potential recipients of the message. In some example embodiments, the transmission module 320 prioritizes the order in which the other users are presented in the indication 420 based on their level of relevance to the first user. For example, in some example embodiments, the transmission module 320 determines a corresponding level of relevance for each candidate user in the subset of candidate users, and then ranks the candidate users in the subset of candidate users based on their corresponding levels of relevance. The indications 420 of the candidate users in the subset of candidate users are then displayed in the user interface 400 in an order based on the ranking, such as the candidate user with the highest level of relevance being displayed at the top, the candidate user the second highest level of relevance being displayed immediately under the candidate user with the highest level of relevance, and so on and so forth.

The level of relevance may be determined based on a variety of factors, including, but not limited to, the level of connection between the candidate user and the first user (e.g., users that are directly connected with the first user have a higher level of connection with, and thus a higher level of relevance to, the first user than users that are indirectly connected to the first user through other users), and the level of similarity between the profile data of the candidate user and the profile data of the first user (e.g., users that have similar jobs or interests as the first user have a higher level of similarity, and thus relevance, to the first user than users that do not have similar jobs or interests as the first user). Other types of factors for determining the level of relevance are also within the scope of the present disclosure.

In some example embodiments, the identification module 310 is configured to determine that one or more additional users in the captured image cannot be identified, and to display an indication of the additional user(s). The determination that the additional user(s) cannot be identified may be based on the identification module 310 searching through a pool of images (e.g., profile images accessed via a database of a social networking service) to find a match with the specific face in the captured image that the identification module 310 is attempting to identify, and the identification module 310 not finding a match. In FIG. 4, the user interface 400 displays an indication 450 of user 412-C, who cannot be identified. The indication 450 comprises an image of the face of user 412-C. Additionally, the user interface 400 may also be configured to receive an identification of the additional user(s) from the first user via one or more user interface elements. For example, the user interface 400 may provide a text box 452 in which the first user may enter the name of the additional user, and then select a selectable user interface element 454 to cause the identification module 310 to search a database of users to find the identification of the additional user using the entered name. For example, the identification module 310 may perform a search of profiles on a social networking service to find a profile with a name that matches the entered name, and then identify the additional user using the matched profile. In some example embodiments, the user interface 400 may also provide a selectable user interface element (not shown) that the first user can select in order to browse a list of users (e.g., a list of members of a social networking service) from which the first user can select a user to be identified as the additional user. The first user can select, via a selectable user interface element, to include the identified additional user as a recipient of the message.

Additionally, the user interface 400 may provide user interface elements (not shown) that enable the first user to correct the identification of the other user(s) indicated in the indication 420, such as by enabling the first user to enter the correct identity of the other user(s) or to browse and select the correct identity of the other user(s).

In some example embodiments, the identification module 310 is configured to compare the profile image(s) of the candidate users with the captured image based on a facial recognition model. The identification module 310 may learn from the user input correcting the identity of another user and from the user input identifying another user that originally could not be identified by the identification module 310 in order to modify the facial recognition model using machine learning. For example, in some example embodiments, the identification module 310 is configured to modify the facial recognition model using one or more machine learning operations based on the captured image 410 and the identification of any additional users not originally identified and/or the corrected identification of any other users that were originally identified.

In some example embodiments, the user interface 400 provides one or more user interface elements configured to enable the first user to enter text to be included in the message to the other users. For example, the user interface 400 may display a text box in which the first user may enter text 430. Once the first user has confirmed the identification of the other users to be included as recipients of the message and the first user has entered any text to be included in the message, the first user can select a selectable user interface element 440 that is configured to generate and transmit the message based on the identified other user(s), the captured image, and any text entered by the user to be included in the message.

Figure 5:
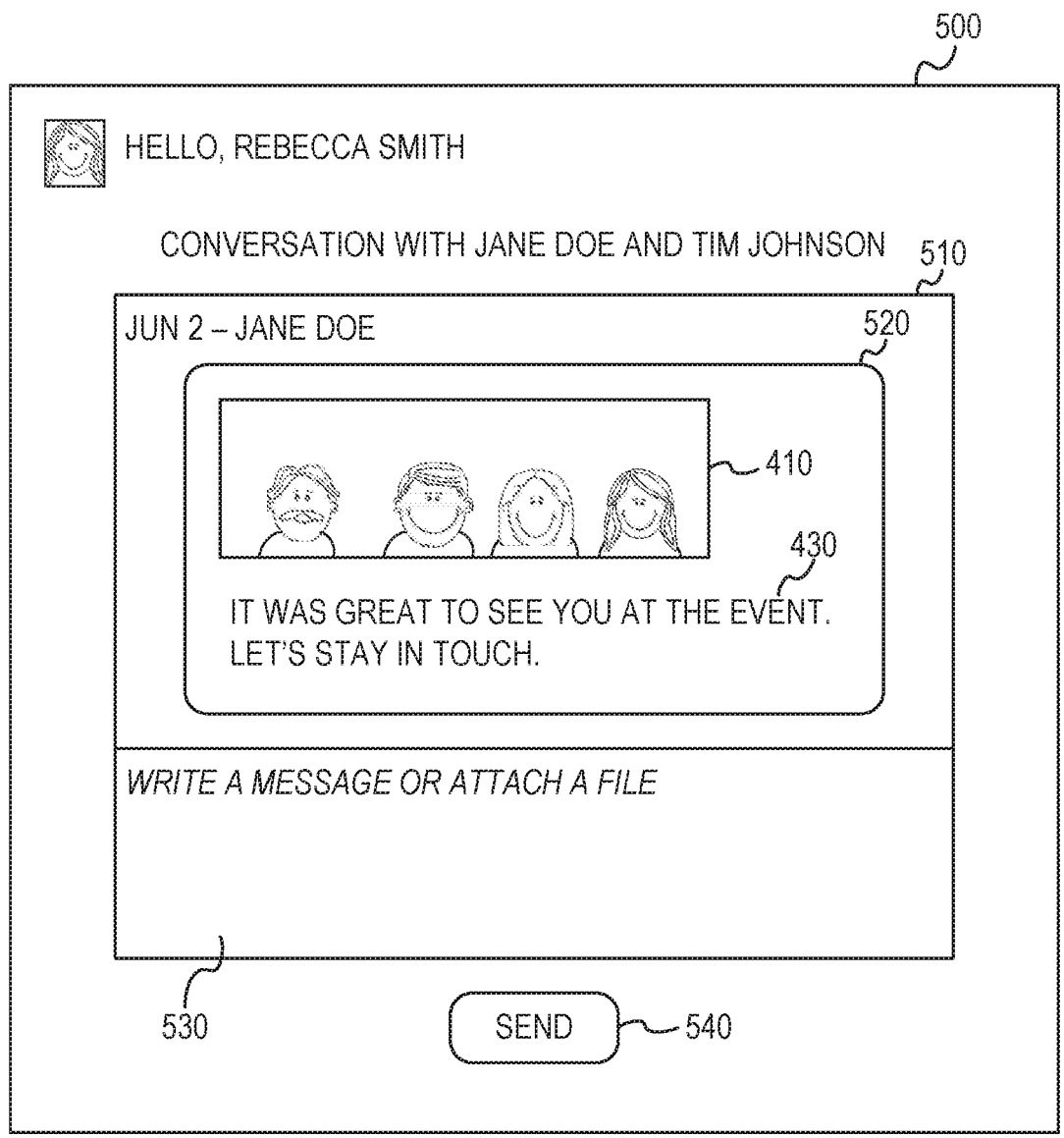
FIG. 5 illustrates a user interface displaying a conversation started based on a captured image, in accordance with an example embodiment.

In some example embodiments, the transmission of the generated message creates a conversation between the first user and any other user(s) included as recipients of the message. FIG. 5 illustrates a user interface 500 displaying a conversation 510 started based on a transmission of a message 520 generated based on the captured image 410, in accordance with an example embodiment. In one example, since the other user 412-C was not identified in FIG. 4, the message was not transmitted to any electronic destination associated with the other user 412-C, and the other user 412-C is therefore not included as part of the conversation 510. The message 520 includes the captured image 410 and any text 430 entered by the first user to be included in the message 520. In some example embodiments, the user interface 500 displays one or more user interface elements, such as a text box 530 and a selectable "SEND" button, configured to enable the recipient of the message and participants of the conversation to reply to the message 520 and add to the conversation 510.

Figure 6:
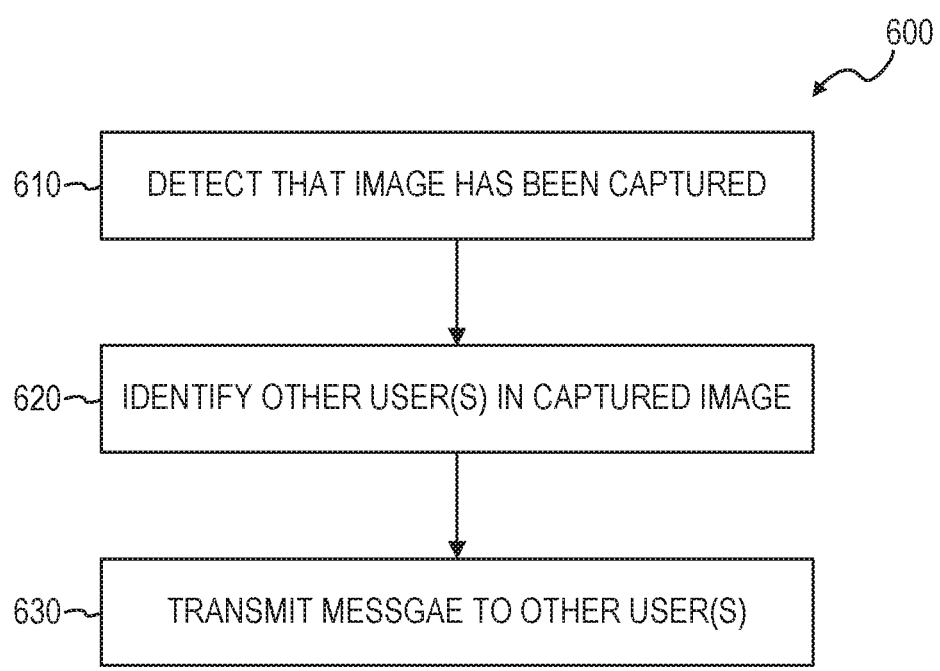
FIG. 6 is a flowchart illustrating a method of starting a communication based on a captured image, in accordance with an example embodiment.

FIG. 6 is a flowchart illustrating a method 600 of starting a communication based on a captured image, in accordance with an example embodiment. The method 600 can be performed by processing logic that can comprise hardware (e.g., circuitry, dedicated logic, programmable logic, microcode, etc.), software (e.g., instructions run on a processing device), or a combination thereof. In one implementation, the method 600 is performed by the communication system 216 of FIGS. 2-3, as described above.

At operation 610, the communication system 216 detects that an image has been captured by a camera on a first mobile device of a first user. In some example embodiments, the captured image has been captured by the camera at a particular point in time. The communication system 216 may detect that the image has been captured by the camera in response to, or otherwise based on, the image having been captured by the camera.

At operation 620, the communication system 216, in response to detecting that the image has been captured, identifies at least one other user in the captured image. The communication system 216 may compare images of candidate users who could potentially be present in the captured image with the captured image using one or more facial recognition operations to match the faces of candidate users with the faces of the users in the captured image. In some example embodiments, the communication system 216 uses profile images of users from a social networking service for comparing with the captured image so that the identity of the users can be determined by the profile images. In some example embodiments, the performance of the identifying the other user(s) in the captured image is conditioned upon a determination that the captured image includes the first user.

At operation 630, the communication system 216 transmits a message to an electronic destination associated with the other user(s) based on the identifying of the other user(s) in the captured image. In some example embodiments, operation 630 comprises generating the message in response to, or otherwise based on, the determination that other users are present in the captured image. In some example embodiments, the generating of the message comprises automatically including the captured image in the message without receiving a user instruction from the first mobile device to include the captured image in the message. In some example embodiments, the generating of the message comprises automatically addressing the message to the electronic destination(s) of the other user(s) without the first user specifying the electronic destination.

It is contemplated that any of the other features described within the present disclosure can be incorporated into the method 600.

Figure 7:
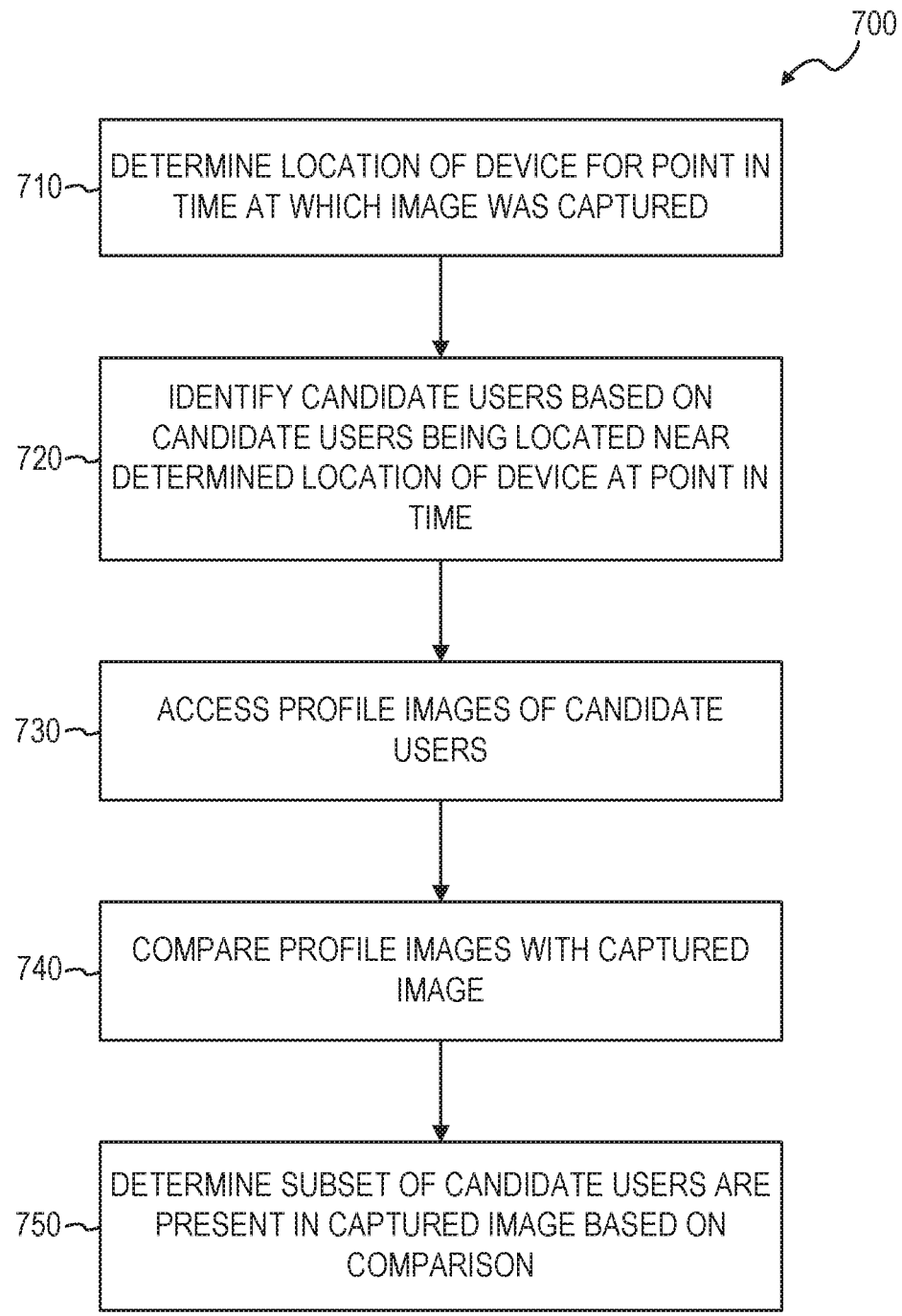
FIG. 7 is a flowchart illustrating a method of identifying users in a captured image, in accordance with an example embodiment.

FIG. 7 is a flowchart illustrating a method 700 of identifying users in a captured image, in accordance with an example embodiment. The method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by the communication system 216 of FIGS. 2-3, as described above.

At operation 710, the communication system 216 determines a location of the first mobile device for the particular point in time at which the image was captured by the camera on the mobile device of the first user. The communication system 216 may determine the location of the first mobile device in a variety of ways, including, but not limited to, using GPS data of the mobile device or using self-reported positioning or check-in data of the user associated with the mobile device.

At operation 720, the communication system 216 identifies a plurality of candidate users based on a determination that the plurality of candidate users are located near the determined location of the first mobile device for the particular point in time. The location of the candidate users may be determined in a variety of ways, including, but not limited to, using GPS data of their corresponding mobile devices or using self-reported positioning or check-in data of the candidate users.

At operation 730, the communication system 216, for each one of the candidate users identified at operation 720, accesses at least one profile image of the candidate user from a corresponding profile of the candidate user on a social networking service. At operation 740, the communication system 216, for each one of the candidate users, compares the profile image(s) of the candidate user with the captured image. At operation 750, the communication system 216 determines that a subset of the candidate users are present in the captured image based on the comparison of the profile image(s) with the captured image, with the subset of the candidate users being identified as the other user(s) in the captured image.

It is contemplated that any of the other features described within the present disclosure can be incorporated into the method 700.

Figure 8:
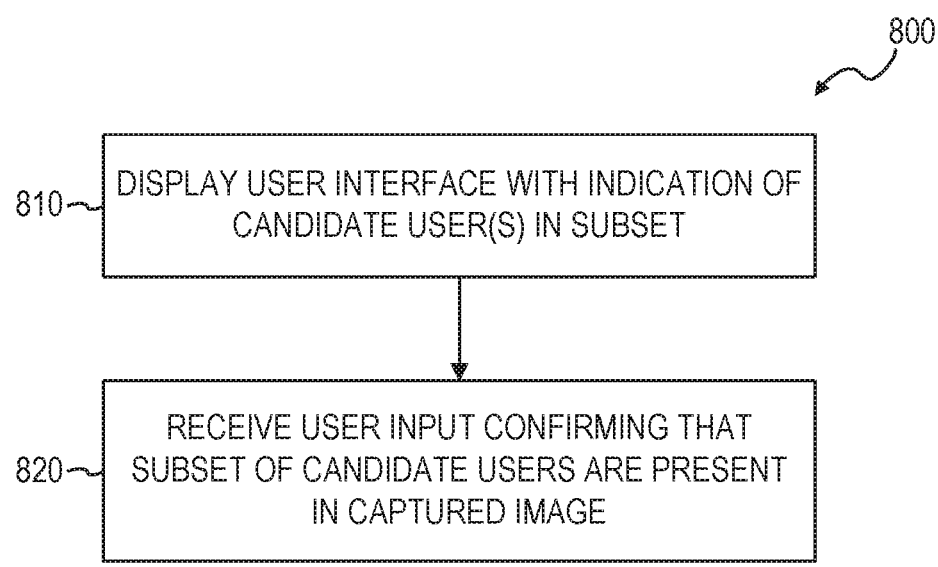
FIG. 8 is a flowchart illustrating another method of identifying users in a captured image, in accordance with an example embodiment.

FIG. 8 is a flowchart illustrating another method 800 of identifying users in a captured image, in accordance with an example embodiment. The method 800 can be performed by processing logic that can comprise hardware (e.g., circuitry, dedicated logic, programmable logic, microcode, etc.), software (e.g., instructions run on a processing device), or a combination thereof. In one implementation, the method 800 is performed by the communication system 216 of FIGS. 2-3, as described above.

At operation 810, the communication system 216 causes a user interface to be displayed on the first mobile device. In some example embodiments, the user interface displays an indication of each candidate user in the subset of candidate users, and the user interface is configured to receive user input from the first user to confirm, for each one of the candidate users in the subset of candidate users, whether the candidate user is present in the captured image.

At operation 820, the communication system 216 receives, from the first mobile device, user input confirming that the subset of candidate users are present in the captured image. In some example embodiments, the determination that the subset of the candidate users are present in the captured image, at operation 750 in FIG. 7, is further based on user input confirming that the subset of candidate users are present in the captured image.

It is contemplated that any of the other features described within the present disclosure can be incorporated into the method 800.

Figure 9:
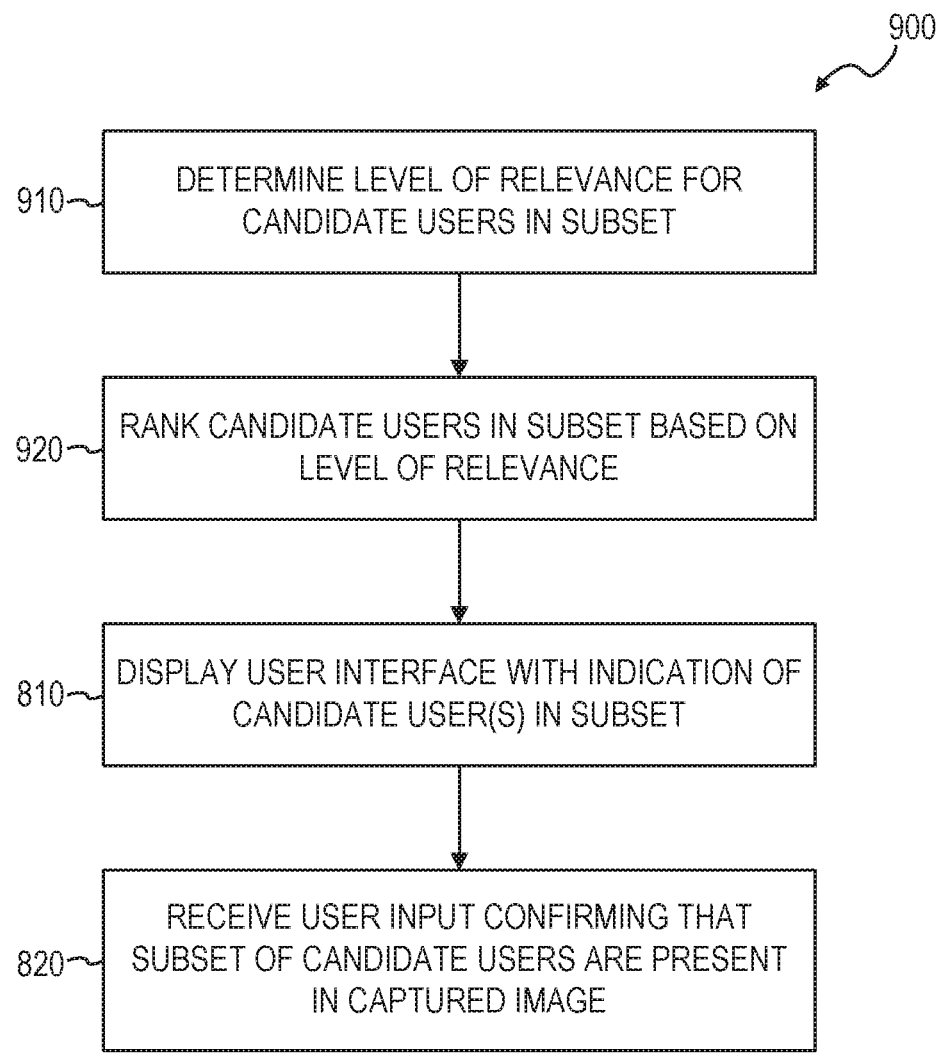
FIG. 9 is a flowchart illustrating yet another method of identifying users in a captured image, in accordance with an example embodiment.

FIG. 9 is a flowchart illustrating yet another method 900 of identifying users in a captured image, in accordance with an example embodiment. The method 900 can be performed by processing logic that can comprise hardware (e.g., circuitry, dedicated logic, programmable logic, microcode, etc.), software (e.g., instructions run on a processing device), or a combination thereof. In one implementation, the method 900 is performed by the communication system 216 of FIGS. 2-3, as described above.

In some example embodiments, the method 900 comprises operations 910 and 920 preceding operation 810 of FIG. 8. At operation 910, the communication system 216 determines a corresponding level of relevance for each candidate user in the subset of candidate users. The level of relevance may be determined based on a variety of factors, including, but not limited to, the level of connection between the candidate user and the first user (e.g., users that are directly connected with the first user have a higher level of connection with, and thus a higher level of relevance to, the first user than users that are indirectly connected to the first user through other users), and the level of similarity between the profile data of the candidate user and the profile data of the first user (e.g., users that have similar jobs or interests as the first user have a higher level of similarity, and thus relevance, to the first user than users that do not have similar jobs or interests as the first user). Other types of factors for determining the level of relevance are also within the scope of the present disclosure.

At operation 920, the communication system 216 ranks the candidate users in the subset of candidate users based on their corresponding levels of relevance. For example, the candidate users having the highest level of relevance may be given the highest priority in the ranking. At operation 810, the indications of the candidate users in the subset of candidate users are displayed in an order based on the ranking.

It is contemplated that any of the other features described within the present disclosure can be incorporated into the method 900.

Figure 10:
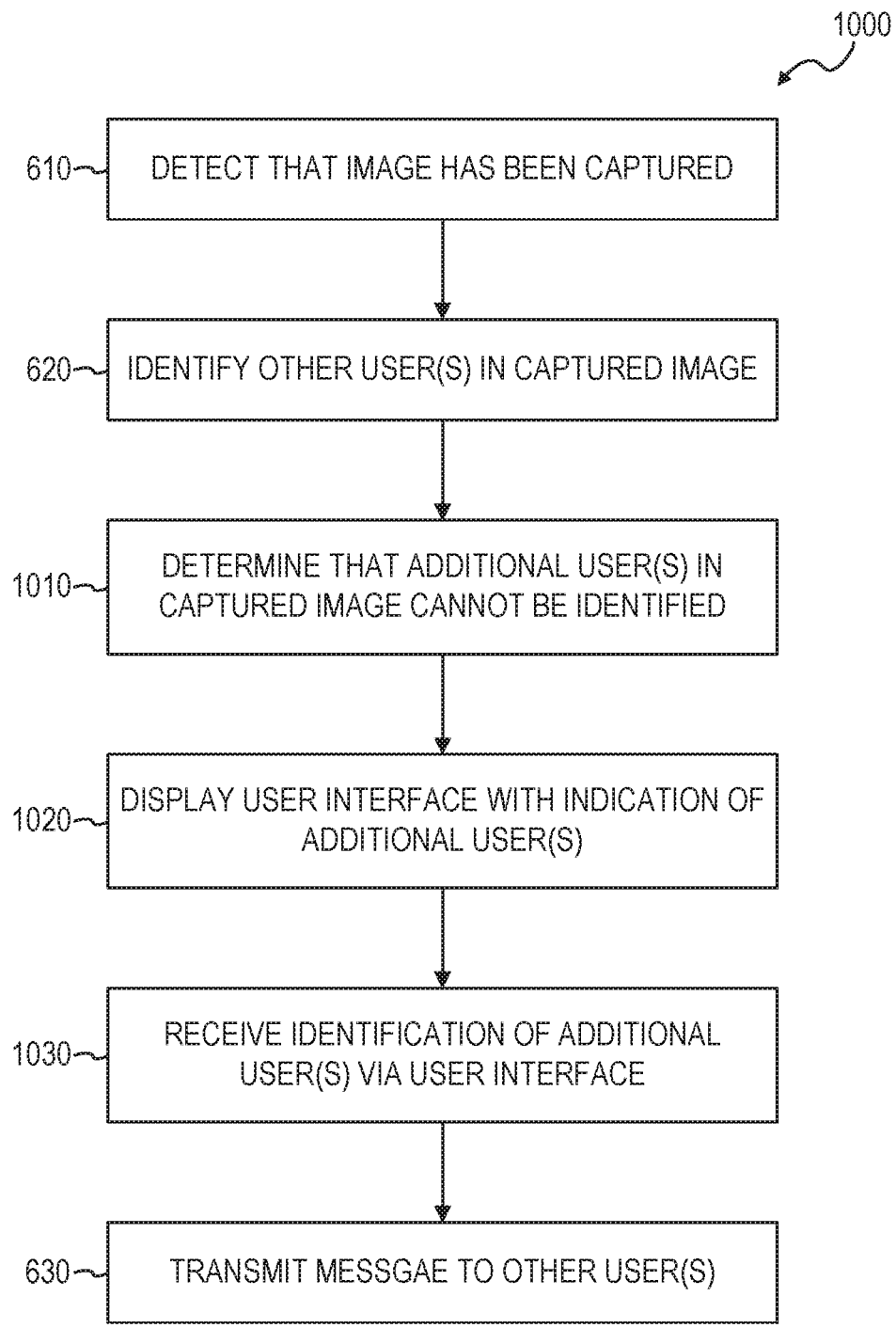
FIG. 10 is a flowchart illustrating yet another method of identifying users in a captured image, in accordance with an example embodiment.

FIG. 10 is a flowchart illustrating yet another method 1000 of identifying users in a captured image, in accordance with an example embodiment. The method 1000 can be performed by processing logic that can comprise hardware (e.g., circuitry, dedicated logic, programmable logic, microcode, etc.), software (e.g., instructions run on a processing device), or a combination thereof. In one implementation, the method 1000 is performed by the communication system 216 of FIGS. 2-3, as described above.

In some example embodiments, the method 100 comprises operations 1010, 1020, and 1030 following operation 620 of FIG. 6 and preceding operation 630 of FIG. 6. At operation 1010, the communication system 216 determines that an additional user in the captured image cannot be identified in the identifying operation 620. The determination that the additional user(s) cannot be identified may be based on the communication system 216 searching through a pool of images (e.g., profile images accessed via a database of a social networking service) to find a match with the specific face in the captured image that the communication system 216 is attempting to identify, and the communication system 216 not finding a match.

At operation 1020, the communication system 216 causes a user interface to be displayed on the first mobile device. In some example embodiments, the user interface displays an indication of the additional user in the captured image, and the user interface is configured to receive an identification of the additional user from the first user. For example, the user interface may provide a text box in which the first user may enter the name of the additional user, and then select a selectable user interface element to cause the communication system 216 to search a database of users to find the identification of the additional user using the entered name. For example, the communication system 216 may perform a search of profiles on a social networking service to find a profile with a name that matches the entered name, and then identify the additional user using the matched profile. In some example embodiments, the user interface may also provide a selectable user interface element that the first user can select in order to browse a list of users (e.g., a list of members of a social networking service) from which the first user can select a user to be identified as the additional user. The first user can select, via a selectable user interface element, to include the identified additional user as a recipient of the message.

At operation 1030, the communication system 216 receives the identification of the additional user from the first mobile device. At operation 630, the message is transmitted to an electronic destination associated with the additional user based on the identification of the additional user at operation 1030.

It is contemplated that any of the other features described within the present disclosure can be incorporated into the method 1000.

Example Mobile Device

Figure 11:
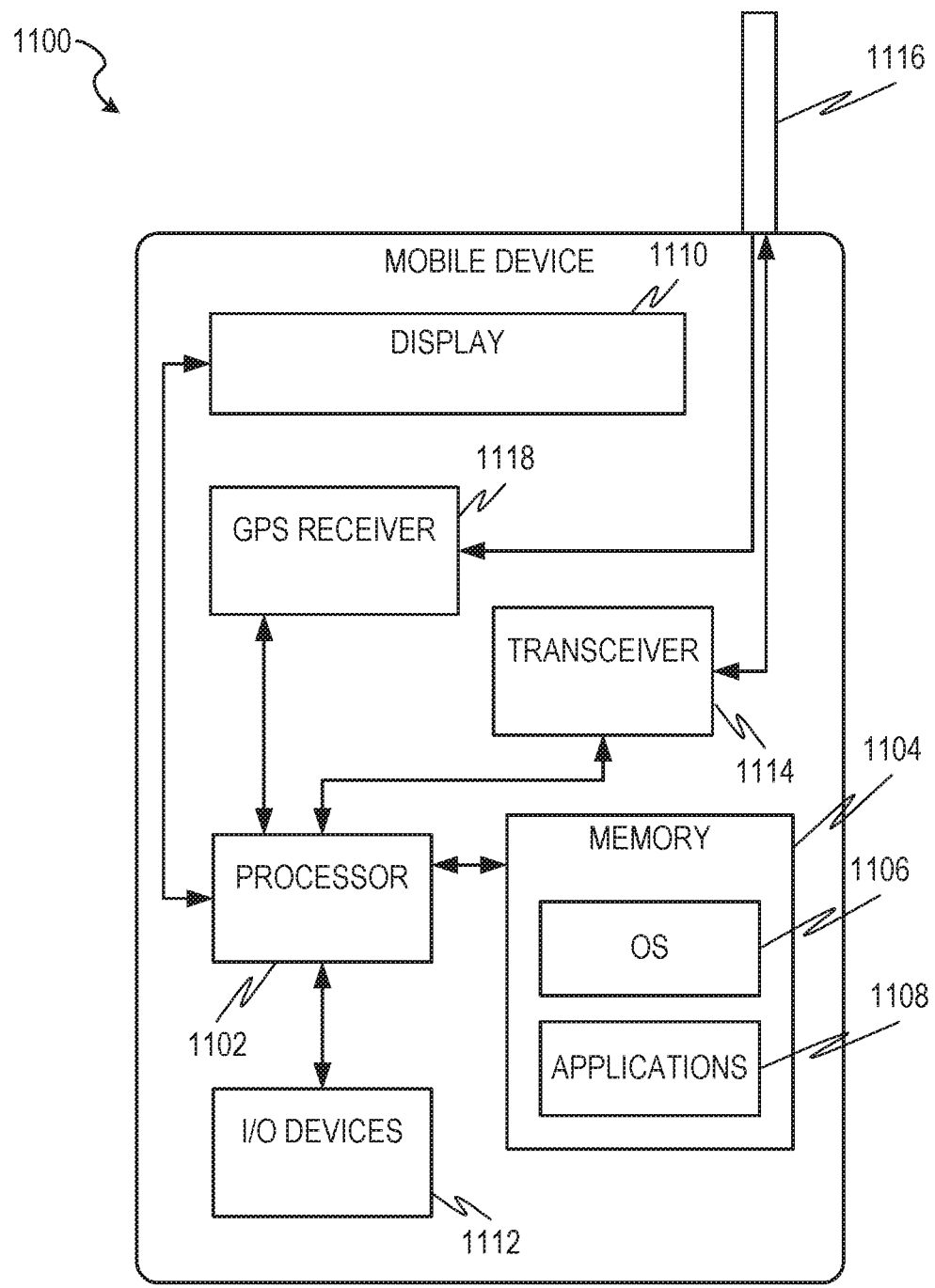
FIG. 11 is a block diagram illustrating a mobile device, in accordance with some example embodiments.

FIG. 11 is a block diagram illustrating a mobile device 1100, according to an example embodiment. The mobile device 1100 can include a processor 1102. The processor 1102 can be any of a variety of different types of commercially available processors suitable for mobile devices 1100 (for example, an XScale architecture microprocessor, a Microprocessor without Interlocked Pipeline Stages (MIPS) architecture processor, or another type of processor). A memory 1104, such as a random access memory (RAM), a Flash memory, or other type of memory, is typically accessible to the processor 1102. The memory 1104 can be adapted to store an operating system (OS) 1106, as well as application programs 1108, such as a mobile location-enabled application that can provide location-based services (LBSs) to a user. The processor 1102 can be coupled, either directly or via appropriate intermediary hardware, to a display 1110 and to one or more input/output (I/O) devices 1112, such as a keypad, a touch panel sensor, a microphone, and the like. Similarly, in some embodiments, the processor 1102 can be coupled to a transceiver 1114 that interfaces with an antenna 1116. The transceiver 1114 can be configured to both transmit and receive cellular network signals, wireless data signals, or other types of signals via the antenna 1116, depending on the nature of the mobile device 1100. Further, in some configurations, a GPS receiver 1118 can also make use of the antenna 1116 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
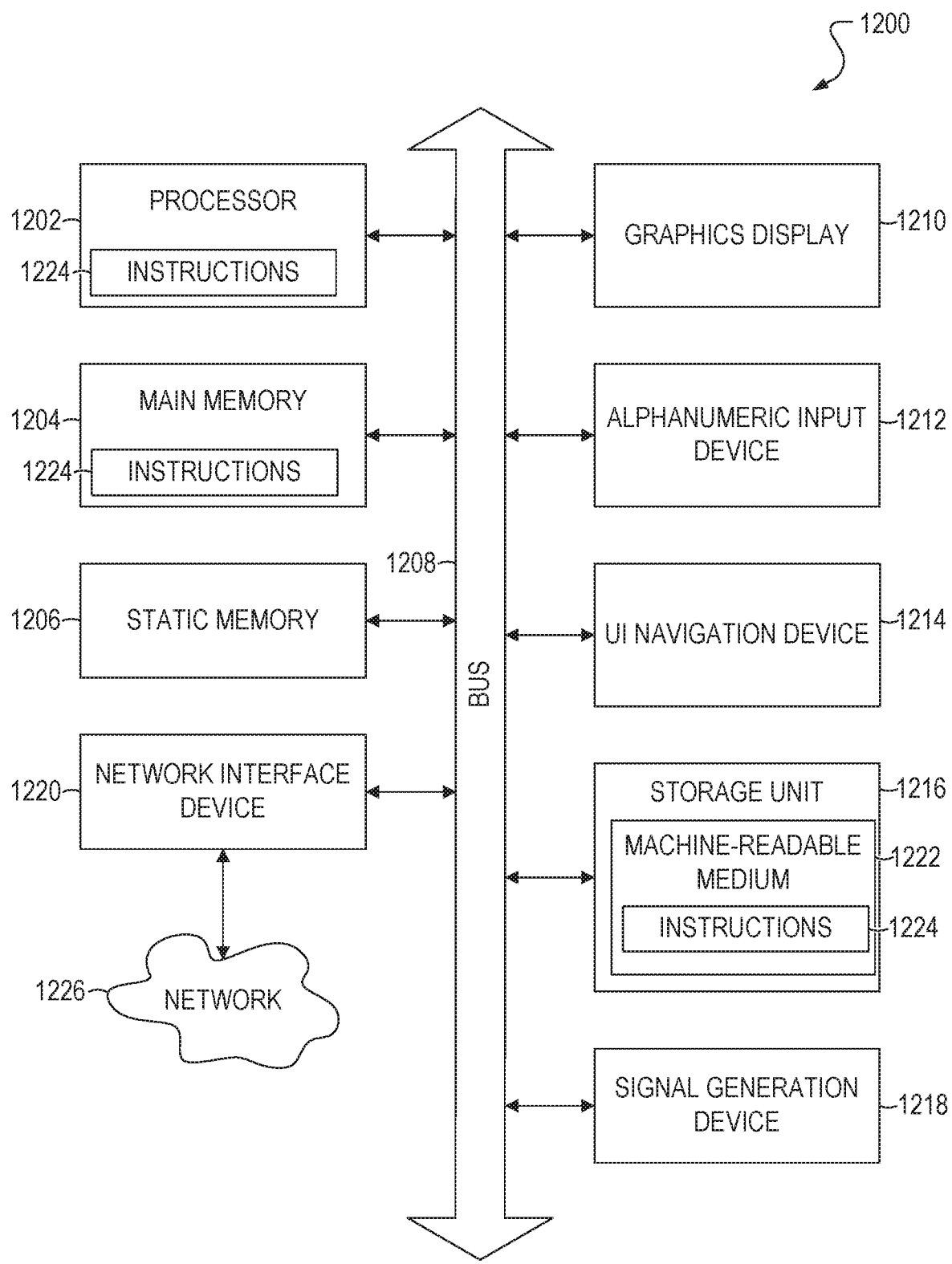
FIG. 12 is a block diagram of an example computer system on which methodologies described herein may be executed, in accordance with an example embodiment.

FIG. 12 is a block diagram of an example computer system 1200 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a graphics display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation device 1214 (e.g., a mouse), a storage unit 1216, a signal generation device 1218 (e.g., a speaker) and a network interface device 1220.

Machine-Readable Medium

The storage unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions (e.g., instructions 1224) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    detecting, by a computer system comprising a memory and at least one hardware processor, that an image has been captured by a camera on a first mobile device of a first user, the captured image having been captured by the camera at a point in time;
    in response to detecting that the image has been captured, identifying, by the computer system, at least one other user in the captured image, the identifying comprising:
        determining a location of the first mobile device for the point in time;
        identifying a plurality of candidate users based on a determination that the plurality of candidate users are located near the determined location of the first mobile device for the point in time;
        for each one of the candidate users, accessing at least one profile image of the one of the candidate users from a corresponding profile of the one of the candidate users on a social networking service;
        for each one of the candidate users, comparing the at least one profile image of the one of the candidate user with the captured image; and
        determining that a subset of the candidate users are present in the captured image based on the comparing, the subset of the candidate users being identified as the at least one other user in the captured image; and
    transmitting, by the computer system, a message to an electronic destination associated with the at least one other user based on the identifying of the at least one other user in the captured image.

2. The computer-implemented method of claim 1, wherein the identifying further comprises:
    causing a user interface to be displayed on the first mobile device, the user interface displaying an indication of each candidate user in the subset of candidate users, and the user interface being configured to receive user input from the first user to confirm, for each one of the candidate users in the subset of candidate users, whether the one of the candidate users is present in the captured image; and
    receiving, from the first mobile device, user input confirming that the subset of candidate users are present in the captured image,
    wherein the determining that the subset of the candidate users are present in the captured image is further based on user input confirming that the subset of candidate users are present in the captured image.

3. The computer-implemented method of claim 2, further comprising:
    determining, by the computer system, a corresponding level of relevance for each candidate user in the subset of candidate users; and
    ranking, by the computer system, the candidate users in the subset of candidate users based on their corresponding levels of relevance,
    wherein the indications of the candidate users in the subset of candidate users are displayed in an order based on the ranking.

4. The computer-implemented method of claim 1, further comprising generating, by the computer system, the message in response to the determining that the subset of the candidate users are present in the captured image.

5. The computer-implemented method of claim 4, wherein the generating the message comprises automatically including the captured image in the message without receiving a user instruction from the first mobile device to include the captured image in the message.

6. The computer-implemented method of claim 4, wherein the generating the message comprises automatically addressing the message to the electronic destination without the first user specifying the electronic destination.

7. The computer-implemented method of claim 1, further comprising:
    determining, by the computer system, that an additional user in the captured image cannot be identified in the identifying of at least one other user in the captured image;
    causing, by the computer system, a user interface to be displayed on the first mobile device, the user interface displaying an indication of the additional user, and the user interface being configured to receive an identification of the additional user from the first user; and
    receiving, by the computer system, the identification of the additional user from the first mobile device,
    wherein the message is transmitted to an electronic destination associated with the additional user based on the identification of the additional user.

8. The computer-implemented method of claim 7, wherein the comparing of the at least one profile image of the one of the candidate user with the captured image is based on a facial recognition model, and the method further comprises:
    modifying, by the computer system, the facial recognition model using one or more machine learning operations based on the captured image and the identification of the additional user.

9. The computer-implemented method of claim 1, wherein performance of the identifying the at least one other user in the captured image is conditioned upon a determination the captured image includes the first user.

10. A system comprising:
    at least one hardware processor; and
    a non-transitory machine-readable medium embodying a set of instructions that, when executed by the at least one hardware processor, cause the at least one processor to perform operations, the operations comprising:
        detecting that an image has been captured by a camera on a first mobile device of a first user, the captured image having been captured by the camera at a point in time;
        in response to detecting that the image has been captured, identifying at least one other user in the captured image, the identifying comprising:
            determining a location of the first mobile device for the point in time;
            identifying a plurality of candidate users based on a determination that the plurality of candidate users are located near the determined location of the first mobile device for the point in time;
            for each one of the candidate users, accessing at least one profile image of the one of the candidate users from a corresponding profile of the one of the candidate users on a social networking service;
            for each one of the candidate users, comparing the at least one profile image of the one of the candidate user with the captured image; and
            determining that a subset of the candidate users are present in the captured image based on the comparing, the subset of the candidate users being identified as the at least one other user in the captured image; and
        transmitting a message to an electronic destination associated with the at least one other user based on the identifying of the at least one other user in the captured image.

11. The system of claim 10, wherein the identifying further comprises:
    causing a user interface to be displayed on the first mobile device, the user interface displaying an indication of each candidate user in the subset of candidate users, and the user interface being configured to receive user input from the first user to confirm, for each one of the candidate users in the subset of candidate users, whether the one of the candidate users is present in the captured image; and
    receiving, from the first mobile device, user input confirming that the subset of candidate users are present in the captured image,
    wherein the determining that the subset of the candidate users are present in the captured image is further based on user input confirming that the subset of candidate users are present in the captured image.

12. The system of claim 11, further comprising:
    determining a corresponding level of relevance for each candidate user in the subset of candidate users; and
    ranking the candidate users in the subset of candidate users based on their corresponding levels of relevance,
    wherein the indications of the candidate users in the subset of candidate users are displayed in an order based on the ranking.

13. The system of claim 10, further comprising generating the message in response to the determining that the subset of the candidate users are present in the captured image.

14. The system of claim 13, wherein the generating the message comprises automatically including the captured image in the message without receiving a user instruction from the first mobile device to include the captured image in the message.

15. The system of claim 13, wherein the generating the message comprises automatically addressing the message to the electronic destination without the first user specifying the electronic destination.

16. The system of claim 10, further comprising:
    determining that an additional user in the captured image cannot be identified in the identifying of at least one other user in the captured image;
    causing a user interface to be displayed on the first mobile device, the user interface displaying an indication of the additional user in the captured image, and the user interface being configured to receive an identification of the additional user from the first user; and
    receiving the identification of the additional user from the first mobile device,
    wherein the message is transmitted to an electronic destination associated with the additional user based on the identification of the additional user.

17. The system of claim 16, wherein the comparing of the at least one profile image of the one of the candidate user with the captured image is based on a facial recognition model, and the method further comprises:
    modifying the facial recognition model using one or more machine learning operations based on the captured image and the identification of the additional user.

18. The system of claim 10, wherein performance of the identifying the at least one other user in the captured image is conditioned upon a determination the captured image includes the first user.

19. A non-transitory machine-readable medium embodying a set of instructions that, when executed by at least one hardware processor, cause the processor to perform operations, the operations comprising:
    detecting that an image has been captured by a camera on a first mobile device of a first user, the captured image having been captured by the camera at a point in time;
    in response to detecting that the image has been captured, identifying at least one other user in the captured image, the identifying comprising:
        determining a location of the first mobile device for the point in time;
        identifying a plurality of candidate users based on a determination that the plurality of candidate users are located near the determined location of the first mobile device for the point in time;
        for each one of the candidate users, accessing at least one profile image of the one of the candidate users from a corresponding profile of the one of the candidate users on a social networking service;
        for each one of the candidate users, comparing the at least one profile image of the one of the candidate user with the captured image; and determining that a subset of the candidate users are present in the captured image based on the comparing, the subset of the candidate users being identified as the at least one other user in the captured image; and transmitting a message to an electronic destination associated with the at least one other user based on the identifying of the at least one other user in the captured image.

20. The non-transitory machine-readable medium of claim 19, wherein the identifying further comprises:

causing a user interface to be displayed on the first mobile device, the user interface displaying an indication of each candidate user in the subset of candidate users, and the user interface being configured to receive user input from the first user to confirm, for each one of the candidate users in the subset of candidate users, whether the one of the candidate users is present in the captured image; and receiving, from the first mobile device, user input confirming that the subset of candidate users are present in the captured image, wherein the determining that the subset of the candidate users are present in the captured image is further based on user input confirming that the subset of candidate users are present in the captured image.

* * * * *

UNITED STATES PATENT AND TRADEMARK OFFICE
CERTIFICATE OF CORRECTION

PATENT NO. : 10,511,763 B1
APPLICATION NO. : 16/011984
DATED : December 17, 2019
INVENTOR(S) : Szeto et al.

Page 1 of 1

It is certified that error appears in the above-identified patent and that said Letters Patent is hereby corrected as shown below:

On the Title Page

Item (22), in "Filed", in Column 1, Line 1, after "2018", insert --¶(65) Prior Publication Data US 2019/0387155 A1 Dec. 19, 2019--

Signed and Sealed this
Fifth Day of May, 2020

Andrei Iancu
*Director of the United States Patent and Trademark Office*